United States Patent
Hampshire

[11] Patent Number: 6,046,879
[45] Date of Patent: Apr. 4, 2000

[54] WEIGHTED LINEARIZATION OF A POSITION ERROR SIGNAL IN A DISC DRIVE

[75] Inventor: Randall David Hampshire, Agra, Okla.

[73] Assignee: Seagate Technology, Inc., Scotts Valley, Calif.

[21] Appl. No.: 08/704,897

[22] Filed: Aug. 30, 1996

Related U.S. Application Data

[60] Provisional application No. 60/018,369, May 16, 1996.

[51] Int. Cl.[7] ................................................. G11B 5/596
[52] U.S. Cl. .................................. 360/77.08; 360/77.11
[58] Field of Search ........................... 360/77.04, 77.05, 360/77.08, 77.11, 78.14

[56] References Cited

U.S. PATENT DOCUMENTS

| | | | |
|---|---|---|---|
| 5,109,307 | 4/1992 | Sidman | 360/77.05 |
| 5,136,439 | 8/1992 | Weispfenning et al. | |
| 5,262,907 | 11/1993 | Duffy et al. | |
| 5,566,034 | 10/1996 | Shumaker | 360/77.04 |
| 5,600,506 | 2/1997 | Baum et al. | 360/78.14 |
| 5,615,065 | 3/1997 | Cheung | 360/77.08 |
| 5,717,538 | 2/1998 | Cheung et al. | 360/77.08 |
| 5,828,516 | 10/1998 | Park | 360/77.08 X |
| 5,867,341 | 2/1999 | Volz et al. | 360/77.08 |

*Primary Examiner*—Andrew L. Sniezek
*Attorney, Agent, or Firm*—Crowe & Dunlevy

[57] ABSTRACT

Apparatus and method for providing a linearized position error signal in a disc drive. A first servo position error signal is generated by the disc drive as a selected combination of servo burst signals received as a disc drive head passes over servo burst fields of a selected track, the first servo position error signal having a magnitude indicative of the position of the head relative to the selected track. A second servo position error signal is also generated by the disc drive as a selected combination of the servo burst signals, the magnitude of the second servo position error signal being different from the magnitude of the first servo position error signal for at least a portion of the width of the selected track. A third servo position error signal is generated as a selectively weighted sum of the first and second servo position error signals, the weighting of the first and second servo position error signals selected to provide the third servo position error signal with nominally constant gain across the width of the selected track. The third servo position error signal is used to generate correction signals which control the amount of current applied to an actuator coil in order to control the position of the head with respect to the selected track.

14 Claims, 7 Drawing Sheets

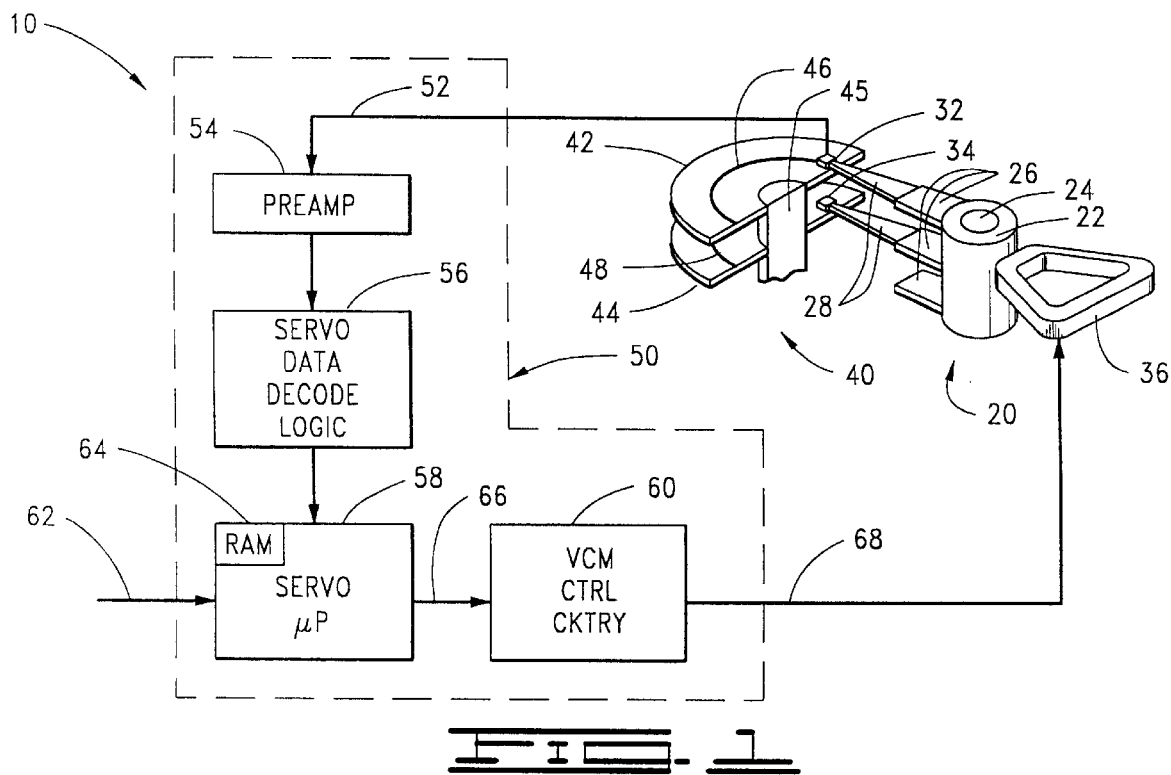
FIG-1
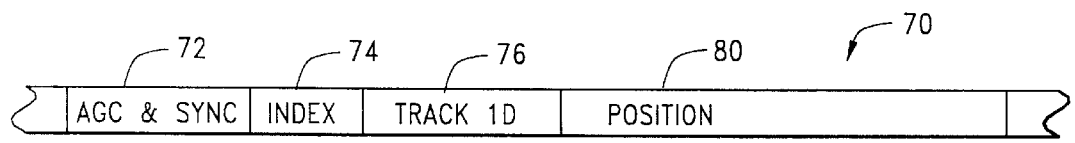
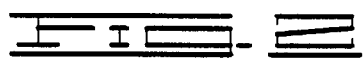
FIG-2
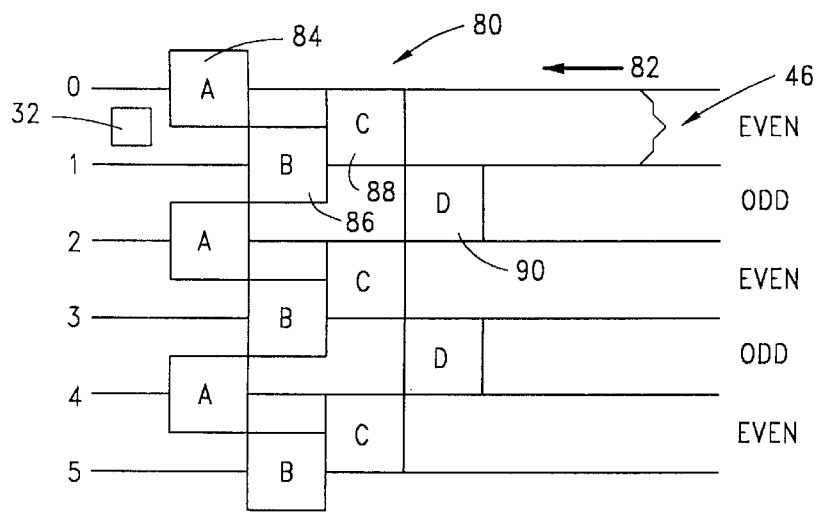
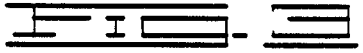
FIG-3

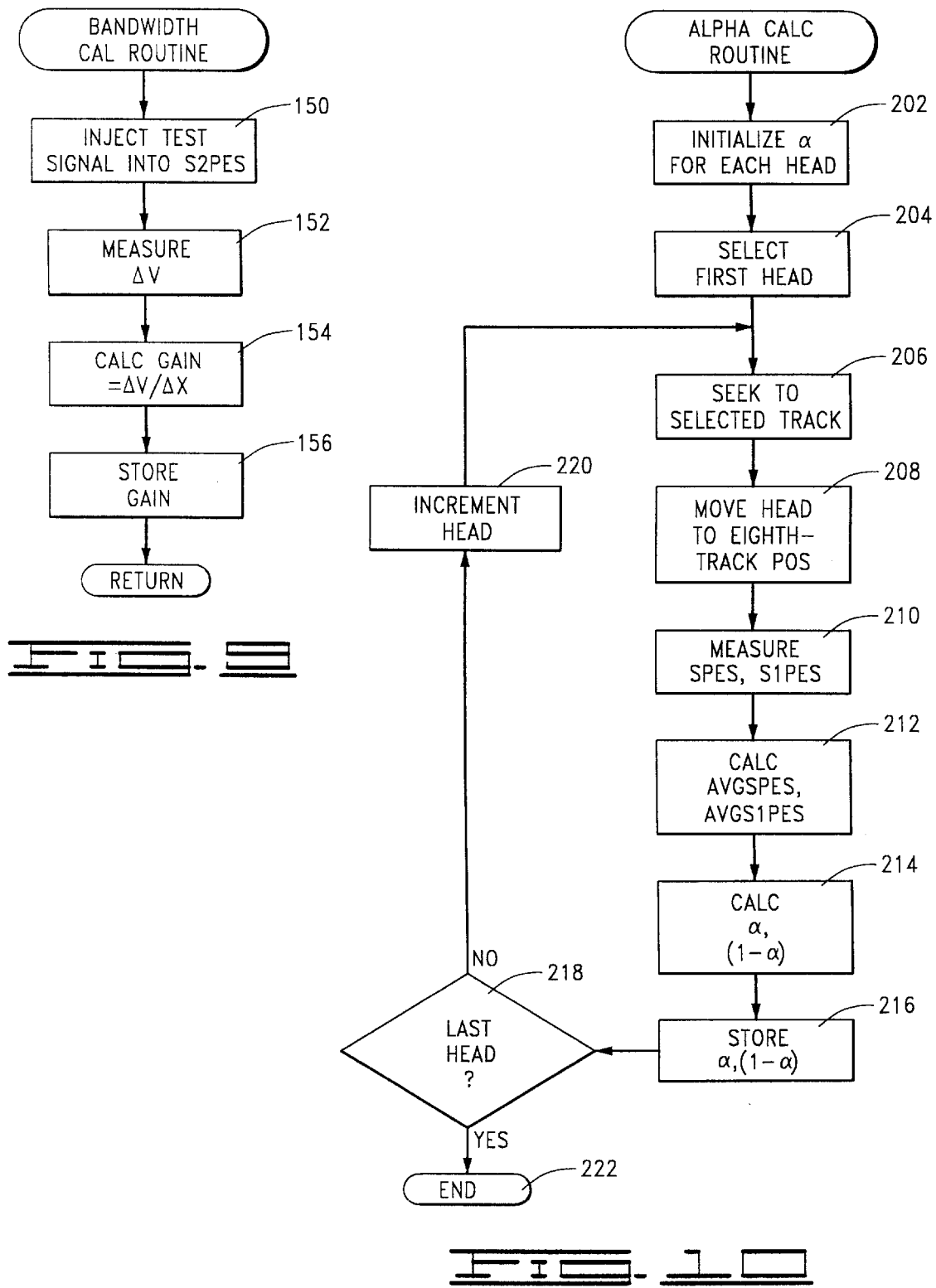

WEIGHTED LINEARIZATION OF A POSITION ERROR SIGNAL IN A DISC DRIVE

RELATED APPLICATIONS

This application claims priority to Provisional Application Ser. No. 60/018,369, filed May 16, 1996.

BACKGROUND OF THE INVENTION

1. Field of the Invention

This invention relates generally to the field of disc drive data storage devices, and more particularly, but not by way of limitation, to an apparatus and method for providing a linear position error signal in a disc drive through the appropriate weighting of selected combinations of servo burst signals.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention and incorporated herein by reference. In such a system, head position (servo) information is provided to the discs to detect and control the position of the heads. As will be recognized, a dedicated servo system entails the dedication of one entire surface of one of the discs to servo information, with the remaining disc surfaces being used for the storage of user data. Alternatively, an embedded servo system involves interleaving the servo information with the user data on each of the surfaces of the discs so that both servo information and user data is read by each of the heads.

With either a dedicated or embedded servo system, it is common to generate a servo position error signal (PES) which is indicative of the position of the head with respect to the center of a selected track. More particularly, during track following in which the head is caused to follow a selected track, the servo system generates the PES from the received servo information and then uses the PES to generate a correction signal which is provided to a power amplifier to control the amount of current through the actuator coil, in order to adjust the position of the head accordingly.

Typically, the PES is presented as a position dependent signal having a magnitude generally indicative of the relative distance between the head and the center of a track and a polarity indicative of the direction of the head with respect to the track center. Thus, it is common for the PES to have normalized values ranging from, for example −1.0 to +1.0 as the head is swept across the track and to have a value of 0 when the head is positioned over the center of the track. It will be recognized that the PES is generated by the servo system by comparing the relative signal strengths of burst signals generated from precisely located magnetized fields in the servo information on the disc surface.

As discussed more fully in the previously incorporated Duffy et al. U.S. Pat. No. 5,262,907, the servo fields are generally arranged in an "offset checkerboard" pattern so that, through manipulation of the magnitudes of the burst signals provided to the servo system as the servo fields are read, the relative position of the head to a particular track center can be determined (and subsequently controlled). More particularly, digital representations of the analog burst signals are typically provided to a servo loop microprocessor, which obtains a digital representation of the value of the PES from a selected combination of the input digital representations of the analog burst signals. The microprocessor then compares the value of the PES to a desired value (indicative of the desired position of the head to the selected track) and issues a digital correction signal to the power amplifier, which in turn provides an analog current to the actuator coil to adjust the position of the actuator accordingly.

It follows that an important consideration in digital servo systems is accurately determining the relationship between the value of the PES and the corresponding distance the head is from a known position, for example the center of a track, in order to effect accurate control of the head position. Particularly, it is important to provide a nominally linear PES over the width of a track to ensure precise servo control and stability of the servo loop.

However, the continuing trend in the disc drive industry is to develop products with ever increasing areal densities (greater than 1 Gbit/in$^2$) and decreasing access times (less than 10 ms), which places greater demands on the ability of modern servo systems to control the position of data heads with respect to data tracks. As track densities continue to increase, a significant problem that results is the ability to manufacture nominally identical heads for use in the disc drive. That is, a disc drive design typically includes the selection of a nominal head width as a selected percentage of the total track width, such as, for example from 50% to 90% of the total track width. The servo system is then designed to operate with a head having a width that is equal or near to the selected nominal head width, within an acceptable tolerance.

However, as track densities increase, it is becoming increasingly more difficult to manufacture heads which meet the tolerances required for new disc drive designs. That is, while track densities continue to increase, manufacturing variations in head widths generally remain constant. Thus, it is increasingly more difficult to supply a population of heads for such increased track densities. This is particularly true with MR heads, which accommodate higher bit densities per track over the thin-film heads of the previous generation, but as a result of increased complexity of MR heads as compared to thin-film heads, MR heads are particularly difficult to manufacture to the strict tolerances needed to accomplish the track densities required by disc drive manufacturers. For example, disc drives of the present generation may require heads to have a nominal width of about 90 $\mu$in., ±10 $\mu$in. As a result, head manufacturers have engaged in time consuming and expensive measurement and sorting operations in order to supply heads meeting the tolerances required by the manufacturers of new drives. These costs are passed along to the manufacturers of the drives, and ultimately, to the consumer.

A related problem which occurs as track densities increase is variation in the width of the tracks. Whereas such variations in track width have not been a significant factor in obtaining accurate servo control in previous disc drives having relatively lower track densities, as track densities continue to increase, variations in track width become increasingly significant. Such variations in track width can occur as a result of imperfections in the magnetic media of the discs, or can occur as a result of errors in the servo track writing process during manufacturing.

There is a need, therefore, for an improved approach to generating a PES in a digital servo system of a disc drive which can accommodate ever increasing track densities, while compensating for manufacturing variations in the width of the heads, as well as variations in track width.

SUMMARY OF THE INVENTION

The present invention provides a method and apparatus for providing a nominally linearized position error signal in a disc drive which can accommodate relatively large variations in head width, track width and the effects of other factors within the drive tending to cause non-linearities in the position error signal.

In accordance with a first aspect of the present invention, a first servo position error signal is generated by the disc drive as a selected combination of servo burst signals received as a disc drive head passes over servo burst fields of a selected track, the first servo position error signal having a magnitude indicative of the position of the head relative to the selected track. A second servo position error signal is also generated by the disc drive as a selected combination of the servo burst signals, the magnitude of the second servo position error signal being different from the magnitude of the first servo position error signal for at least a portion of the width of the selected track.

A third servo position error signal is generated as a selectively weighted sum of the first and second servo position error signals, the weighting of the first and second servo position error signals selected to provide the third servo position error signal with nominally constant gain across the width of the selected track. The third servo position error signal is used to generate correction signals which control the amount of current applied to an actuator coil in order to control the position of the head with respect to the selected track.

In a second aspect of the present invention, the selective weighting of the first and second servo position error signals is determined by initially establishing the relative weighting of the first and second servo position error signals and then adjusting the weighting by measuring the gain of the servo loop as the head is positioned at selected locations relative to the selected track; for example, at the center of the selected track and between the center of the selected track and at a selected boundary of the selected track. Alternatively, the selective weighting of the first and second servo position error signals is determined by accurately positioning the head at a selected position relative to the selected track, measuring the first and second servo position error signals and then determining the weighting therefrom.

An object of the present invention is to provide an improved servo system for a disc drive capable of controlling the position of heads in the disc drive having a relatively high track density.

Another object is to provide an improved position error signal having linear gain characteristics over the width of each track.

Another object is to accommodate significant variations in head width, as well as factors contributing to variations in track width, including anomalies in the media of the discs and errors during the servo write process, while still providing a nominally linear position error signal across each track.

Yet another object is to compensate for factors in the disc drive which prevent conventional servo position error signals from achieving practical servo control.

Other objects, advantages and features of the present invention will be apparent from the following description when read in conjunction with the drawings and appended claims.

BRIEF DESCRIPTION OF THE DRAWINGS

FIG. 1 is a functional block representation of a servo system for a disc drive in which the present invention is particularly useful.

FIG. 2 provides a representation of the general format of a servo frame of the disc drive servo system of FIG. 1.

FIG. 3 shows the four position burst fields of the servo frame of FIG. 2.

FIG. 9 is a BANDWIDTH CAL routine performed in conjunction with the routine of FIG. 8.

FIG. 10 is a flow chart illustrating an ALPHA CALC routine, the ALPHA CALC routine performed as an alternative preferred embodiment of the present invention.

DETAILED DESCRIPTION OF THE PREFERRED EMBODIMENT

Figure 4:
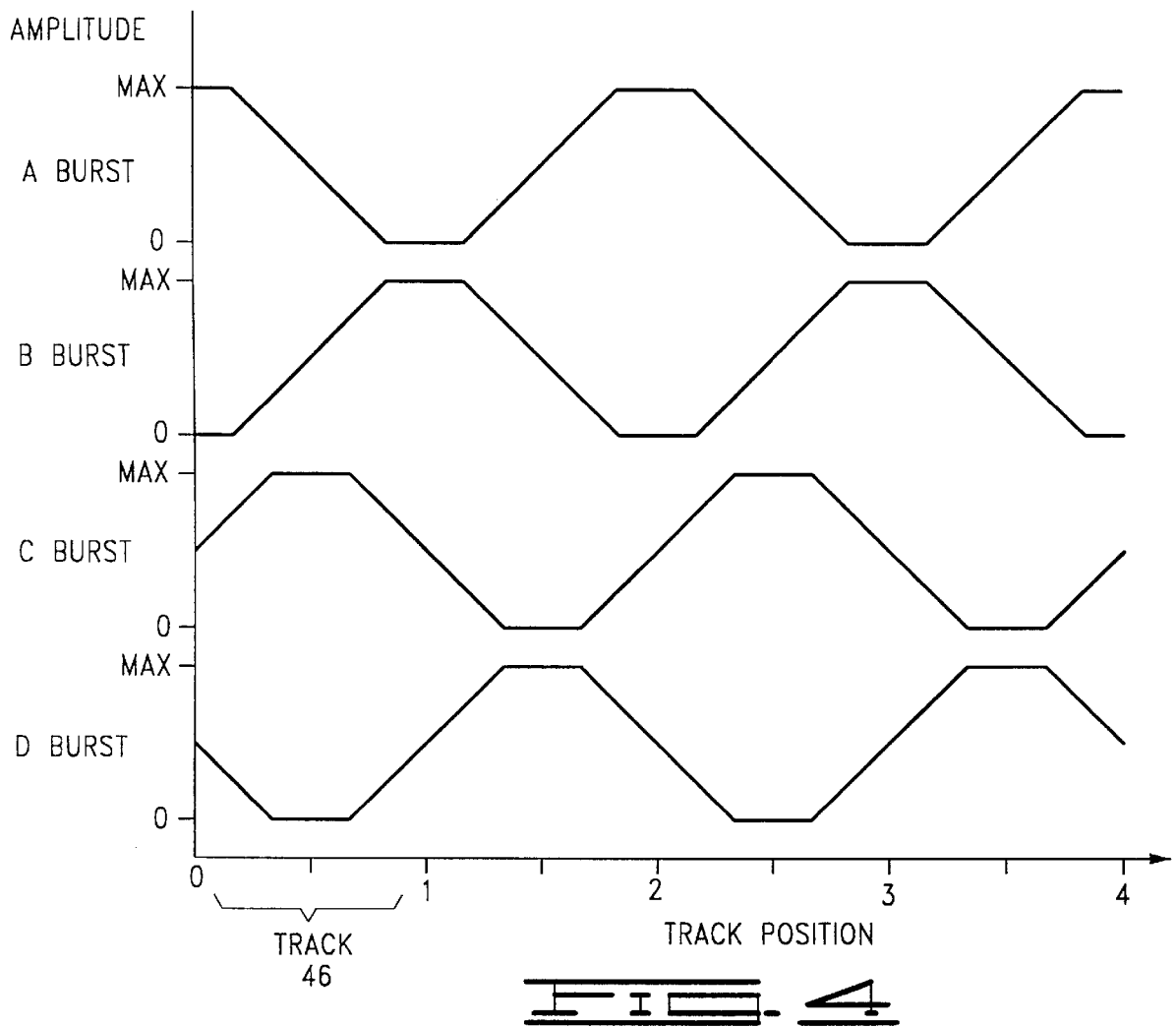
FIG. 4 provides a graphical representation of the amplitudes of the A, B, C and D burst signals from the four position burst fields of FIG. 3.

Turning now to the drawings and more particularly to FIG. 1, shown therein is a functional block representation of a servo system for a disc drive (generally denoted as 10) of the present invention. More particularly, FIG. 1 shows the disc drive 10 to include an actuator assembly 20, a disc stack 40 and a servo loop 50, with the servo loop 50 operably controlling radial position of the actuator assembly 20 with respect to the disc stack 40.

The actuator assembly 20 comprises an actuator body 22 that pivots about a bearing-shaft assembly 24. The actuator body 22 includes arms 26 that extend radially as shown from the actuator body 22, and flexures 28 extend from each of the arms 26. Mounted at the distal end of each of the flexures 28 is a head (two shown in FIG. 1 at 32 and 34, respectively). Additionally, an actuator coil 36 is mounted to the actuator body 22 opposite the arms 26. The coil 36 is part of a conventional voice coil motor (VCM) comprising the coil 36 as well as a pair of permanent magnets (not shown) located above and below the coil 36, so that the coil 36 interacts with the magnetic field established by these magnets as current is passed through the coil 36, resulting in controlled rotational movement of the actuator body 22 about the bearing-shaft assembly 24.

Continuing with FIG. 1, the disc assembly 40 comprises a plurality of discs (two shown at 42 and 44, respectively) mounted to a spindle motor hub 45 for rotation at a constant high speed by a conventional spindle motor (not shown). The surfaces of the discs 42 and 44 comprise a plurality of radially concentric tracks, two of which are shown at 46 and 48, respectively.

It will be recognized that in a typical disc drive there will be one head per disc surface, but for purposes of clarity only two heads 32 and 34 have been shown in FIG. 1, which correspond to the top surfaces of the discs 42 and 44. It will further be recognized that servo information will be prerecorded on at least one of the surfaces of the discs 42, 44 to provide the requisite servo positioning information to the servo loop 50. As provided hereinabove, in a dedicated servo system one surface of one disc is designated as a dedicated servo surface (such as the top surface of the disc 42) so that servo information is prerecorded on all of the tracks on the surface (including track 46) and user data is stored on the tracks of the remaining disc surfaces, such as on track 48 of the top surface of the disc 44; in such a case the head 32 would be a servo head and the head 34 would be a data head. Alternatively, in an embedded servo system, the servo information is intermittently prerecorded on all of the disc surfaces, so that each of the tracks 46 and 48 would contain both servo information and user data and the heads 32 and 34 would operate as both servo and data heads. The present invention is not dependent upon the type of servo system implemented; however, for purposes of clarity it is contemplated that at least track 46 includes servo information that is read by the head 32 and provided to the servo loop 50.

The servo loop 50 receives the servo information from the head 32 on signal path 52 and this servo information is amplified by a preamp circuit 54 and provided to servo data decode logic circuitry 56. The servo data decode logic circuitry 56 includes an analog to digital converter (ADC) so that selected digital representations of the servo information are provided to a servo microprocessor 58. In a manner to be described in more detail below, the servo microprocessor generates discrete, digital PES samples (which in total comprise the PES) from the servo information and uses the PES samples to generate and output correction signals to VCM control circuitry 60. The servo microprocessor 58 determines the correction signals in accordance with commands received by a disc drive system microprocessor (not shown) by way of signal path 62 and programming steps stored in servo RAM 64.

The correction signals are provided by way of signal path 66 to the VCM control circuitry 60, which includes a power amplifier (not shown) that outputs a controlled dc current of a selected magnitude and polarity to the coil 36 by way of signal path 68 in response to the correction signals. Thus, during a track following mode in which the head 32 is continuously positioned over a selected track, such as the track 46, the servo information indicates the relative position error of the head 32 with respect to the center of the track 46 and the resulting correction signals adjust the amount of the dc current applied to the coil 36 in order to compensate for this position error and move the head 32 to the center of the, track 46. A detailed discussion of the construction and operation of the servo loop 50 can be found in the previously incorporated Duffy et al. reference, U.S. Pat. No. 5,262,907 as well as U.S Pat. No. 5,136,439 entitled SERVO POSITION DEMODULATION SYSTEM, issued Aug. 4, 1992 to Weispfenning et al., assigned to the assignee of the present invention and incorporated herein by reference.

As will be recognized, the servo information is recorded during the manufacturing of the disc drive 10 using a highly precise servo writer. The servo information serves to define the boundaries of each of the tracks and is divided circumferentially into a number of frames. The general format of one such frame 70 is shown in FIG. 2. More particularly, FIG. 2 shows the frame 70 to comprise a plurality of fields, including an AGC & Sync field 72, an index field 74, a track ID field 76 and a position field 80. Of particular interest is the position field 80, but for purposes of clarity it will be recognized that the AGC & Sync field 72 provides input for the generation of timing signals used by the disc drive 10, the index field 74 indicates radial position of the track and the track ID field 76 provides the track address. Of course, additional fields may be used as desired and the format of the fields in a servo frame will depend upon the construction of a particular disc drive; for more detailed discussion of typical servo fields see the previously incorporated Duffy et al. U.S. Pat. No. 5,262,907 and Weispfenning et al. U.S. Pat. No. 5,136,439 references.

The position field 80 comprises four position burst fields arranged in an offset, quadrature pattern for a plurality of adjacent tracks, as shown in FIG. 3. More particularly, FIG. 3 shows the position field 80 to comprise burst patterns A, B, C and D having selected geometries and magnetization vectors, defining a plurality of track boundaries identified as 0–5. Thus, each track comprises the area bounded by two adjacent track boundaries (e.g., the track 46 of FIG. 1 is represented in FIG. 3 to be bounded by the track boundaries 0 and 1). Additionally, the head 32 of FIG. 1 is represented in FIG. 3 as being centered on the track 46. The direction of rotation of the disc stack assembly 40 (and hence the position field 80) relative to the head 32 is shown by arrow 82.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 32 passes over the position field 80 on track 46, the head will pass over portions of A and B burst patterns (identified as 84 and 86, respectively) and then over C burst pattern 88. However, the head 32 will not encounter D burst pattern 90, as this pattern is on an adjacent track. For reference, tracks having C burst patterns are referred to as "even tracks" and tracks with D burst patterns are referred to as "odd tracks".

Generally, it will be recognized that when the head 32 is centered at the mid-point of track 46, the amplitude of an A burst signal induced in the head 32 by the A burst pattern 84 will be equal to the amplitude of a B burst signal induced in the head by the B burst pattern 86. Moreover, the amplitude of a C burst signal induced by the C burst pattern 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values, as generally illustrated in FIG. 4.

FIG. 4 provides a graphical representation of the amplitudes of the A, B, C and D burst signals as the head 32 is moved from track boundary 0 to track boundary 4 in FIG. 3. More particularly, FIG. 4 plots each of the burst signals along a common horizontal axis indicative of radial track position and an aligned vertical axis indicative of the amplitude for each of the burst signals from a value of zero to a maximum value. As in FIG. 3, the track 46 is shown in FIG. 4 to comprise the interval between the values of 0 and 1 on the horizontal axis.

Figure 5:
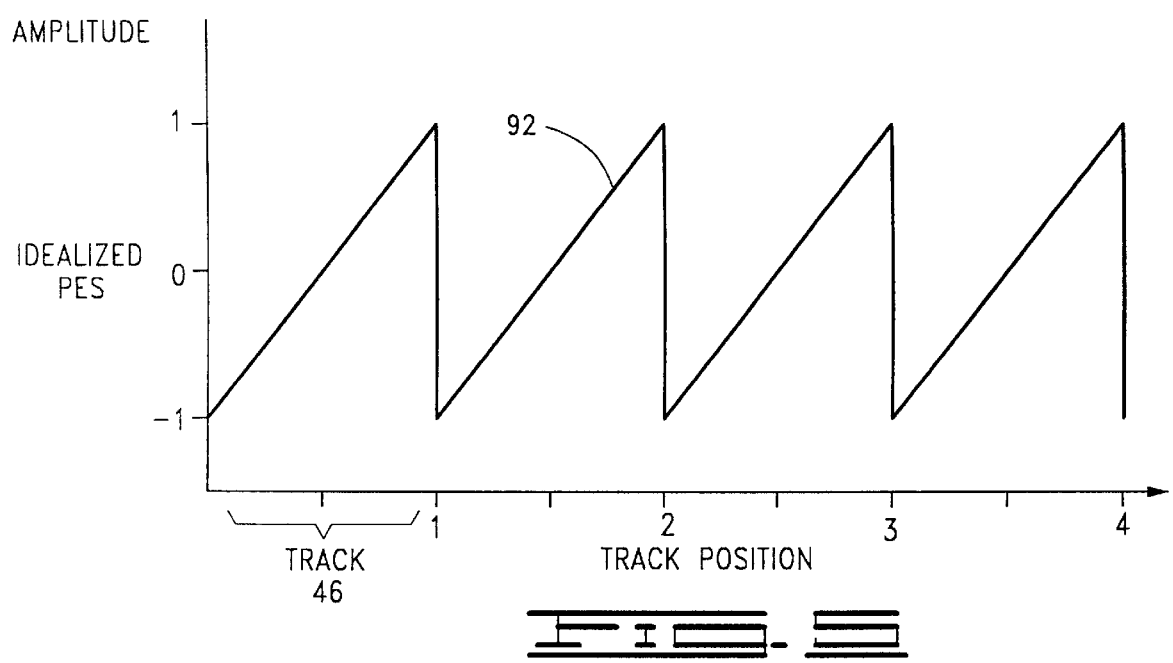
FIG. 5 shows an idealized representation of a linear position error signal generated from the burst signals of FIG. 4.

Referring to FIG. 5, shown therein is a graphical representation of an idealized PES curve 92 generated from the burst signals of FIG. 4. The PES curve 92 has an amplitude that generally ranges in a linear fashion from a minimum value of −1 to a maximum value of +1 as the head is positioned across a track from one track boundary to the next. That is, the PES has a nominal value of zero when the head 32 is positioned at the center of a selected track and the PES increases and decreases, respectively, in a linear fashion as the head is positioned toward the track boundaries. In this way, the amplitude and polarity of the PES curve 92 readily indicate the relative distance and direction of the position of the head 32 with respect to a selected track center and can thus be used to generate the appropriate correction signal to move the head to the center of the selected track. It will be understood that, in a digital servo system, the PES comprises a range of digital values across each track from one track boundary to the next; however, it is conventional to express the relative values of the PES in a normalized, analog fashion as shown on the vertical axis of FIG. 5.

With this background concerning the general configuration and purpose of the servo position field 80 of FIG. 3 during servo operation of the disc drive 10 of FIG. 1, the preferred embodiment will now be discussed. Generally, in the practice of the preferred embodiment of the present invention, the servo microprocessor 58 receives digital representations of the burst signals illustrated in FIG. 4 and generates a first type of PES therefrom which will be referred to herein as a "seamless PES" (or "SPES"). Particularly, the SPES value at any given sample of burst signals is determined in accordance with the following relationships:

$$SPES = \frac{(B - A)}{|A - B| + |C - D|}; \text{for even tracks} \quad (1)$$

and $$SPES = \frac{(A - B)}{|A - B| + |C - D|}; \text{for odd tracks} \quad (2)$$

with A, B, C, and D representing the magnitude of the A, B, C, and D burst signals, as illustrated in FIG. 4. That is, for each sample of burst signals, and depending upon whether the selected track is an even or an odd track, the microprocessor 58 generates an SPES value in accordance with the relationship given above in equation (1) or (2).

Using the head 32 and the track 46 of FIG. 3 by way of example, track 46 being an even track, it will be recognized that the SPES will have a nominal value of zero (SPES=0) when the head 32 is positioned over the center of the track 46, as the magnitudes of the A and B burst signals will be nominally equal, as shown in FIG. 4. For this reason, track centers are also sometimes referred to as "AB nulls".

It will be further recognized that the SPES will have a nominal value of one (SPES=1) when the head 32 of FIG. 3 is positioned over the track boundary 1, as the magnitudes of the C and D burst signals will be nominally equal and the magnitude of the A burst signal will be nominally zero. Likewise, the SPES will have a nominal value of negative one (SPES=−1) when the head 32 of FIG. 3 is positioned over the track boundary 0, as the magnitudes of the C and D burst signals will also be nominally equal and the magnitude of the B burst signal will be nominally zero. Thus, track boundaries, such as boundaries 0–5 shown in FIG. 3, are also sometimes referred to as "CD nulls". At each CD null, the SPES will have values of both −1 and +1; however, the particular value used by the servo loop 50 will depend upon whether the track boundary serves as the "innermost" or the "outermost" boundary for the selected track. Such dual values of ±1 are illustrated in the idealized PES curve 92 of FIG. 5.

Finally, it will be recognized that at locations halfway between each AB null and each CD null (i.e., halfway between the center of the tracks and the track boundaries), the SPES will have nominal values of ±0.5; that is, where the absolute value of the term (A−B) is nominally equal to the absolute value of the term (C−D), then equation (1) reduces to either +0.5 or −0.5, depending upon the values of A and B. For reference, these locations are sometimes referred to as "quarter-track positions", because the distances from track boundaries to the quarter-track positions nominally comprise 25% of the entire track width.

Figure 6:
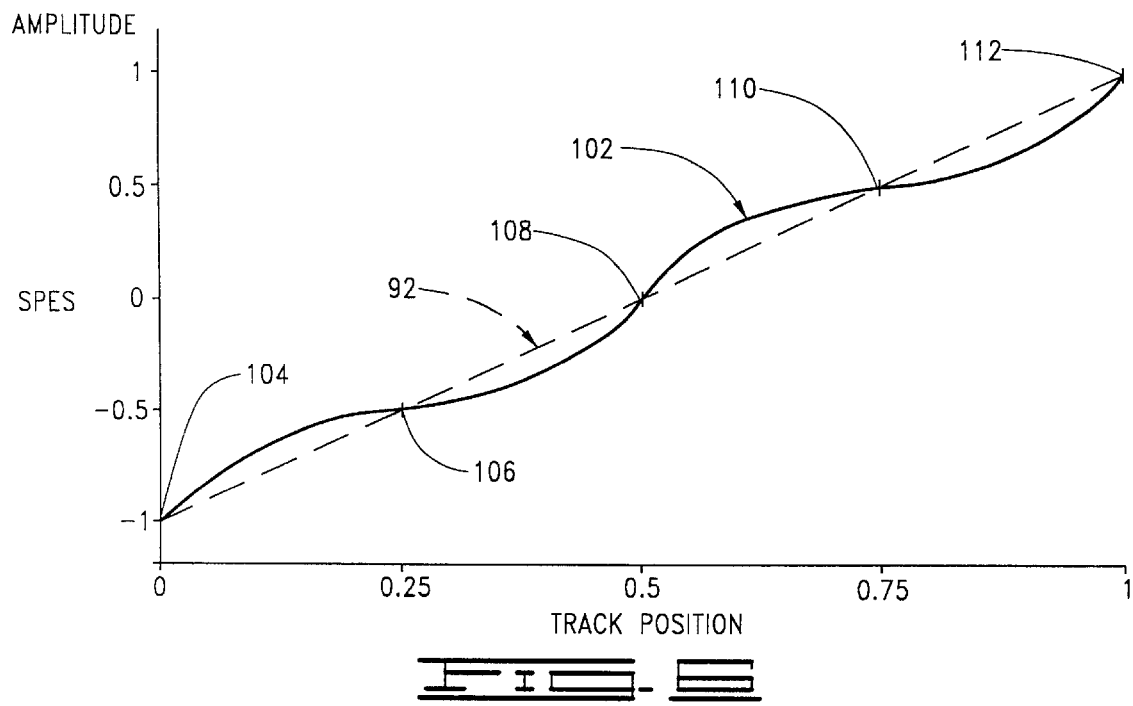
FIG. 6 is a graphical representation of a first type of position error signal generated from the burst signals of FIG. 4.

In summary, the SPES of equations (1) and (2) will have known values of −1, −0.5, 0, +0.5 and +1 at selected locations as the head 32 moves across the track 46 from the track boundary 0 to the track boundary 1. FIG. 6 provides a generalized SPES curve 102, which illustrates this relationship between the SPES value and the position of the head 32. For reference, a corresponding portion of the idealized PES curve 92 of FIG. 5 has been overlaid (in dotted line fashion).

Particularly, the graph of FIG. 6 includes a horizontal axis corresponding to the track 46 of FIG. 3 and a vertical axis representing the corresponding value of the SPES curve 102. As shown in FIG. 6 (and with reference to FIGS. 3 and 4), the SPES curve 102 has a value of −1 (at point 104 on the SPES curve 102) at the track boundary 0, a value of −0.5 (at point 106) at the quarter-track position adjacent the track boundary 0, a value of 0 (at point 108) at the track center, a value of +0.5 (at point 110) at the quarter-track position adjacent the track boundary 1, and a value of +1 (at point 112) at the track boundary 1.

However, as shown in FIG. 6, the SPES curve exhibits significant curvature between points 104, 106, 108, 110 and 112. The amount of the curvature is a function of the relationship between the head width with respect to the track width, but an SPES generated in accordance with equations (1) and (2) will generally provide a shape such as shown by the SPES curve 92. Of particular interest is the fact that the portions of the SPES curve 92 between points 104 and 106 and between points 108 and 110 have "convex" characteristics, in that the midpoints of these portions lie above curve 42, respectively. Further, the portions of the SPES curve 92 falling between the points 106 and 108 and between the points 110 and 112 have "concave" characteristics, in that these portions have midpoints which fall below curve 42. Again, the amount of such curvature will generally be determined by the relationship between the head width and the track width, but other factors, such as electrical and mechanical offsets and changes in system gain with respect to track position can also affect the curvature of the SPES.

In addition to generating an SPES, the microprocessor 58 generates a second type of PES from the burst signals illustrated in FIG. 4, which will be referred to herein as a "seamless-one PES" (or "S1PES"). The S1PES value at each sample of burst signals is determined in accordance with the following relationships:

$$S1PES = \frac{(B-A)|A-B|}{(|A-B|)^2 + (|C-D|)^2}; \text{for even tracks} \quad (3)$$

and $$S1PES = \frac{(A-B)|A-B|}{(|A-B|)^2 + (|C-D|)^2}; \text{for odd tracks} \quad (4)$$

with A, B, C, and D representing the magnitude of the A, B, C, and D burst signals, as illustrated in FIG. 4. That is, for each sample of burst signals received by the microprocessor 58, an S1PES value is generated in accordance with the relationship given above in equations (3) or (4), depending upon whether the track is even or odd.

It will be recognized that at each AB null (track center) the S1PES will have a value of zero (S1PES=0), and at each CD null (track boundary) the S1PES will have a value of positive or negative one (S1PES=±1). Furthermore, at each quarter-track position, wherein |A−B|=|C−D|, it will be recognized that the S1PES will have a value of positive or negative ½ (S1PES=±0.5). Thus, like the SPES of equations (1) and (2), the S1PES of equations (3) and (4) will have values of −1, −0.5, 0, 0.5 and 1 at known locations.

Figure 7:
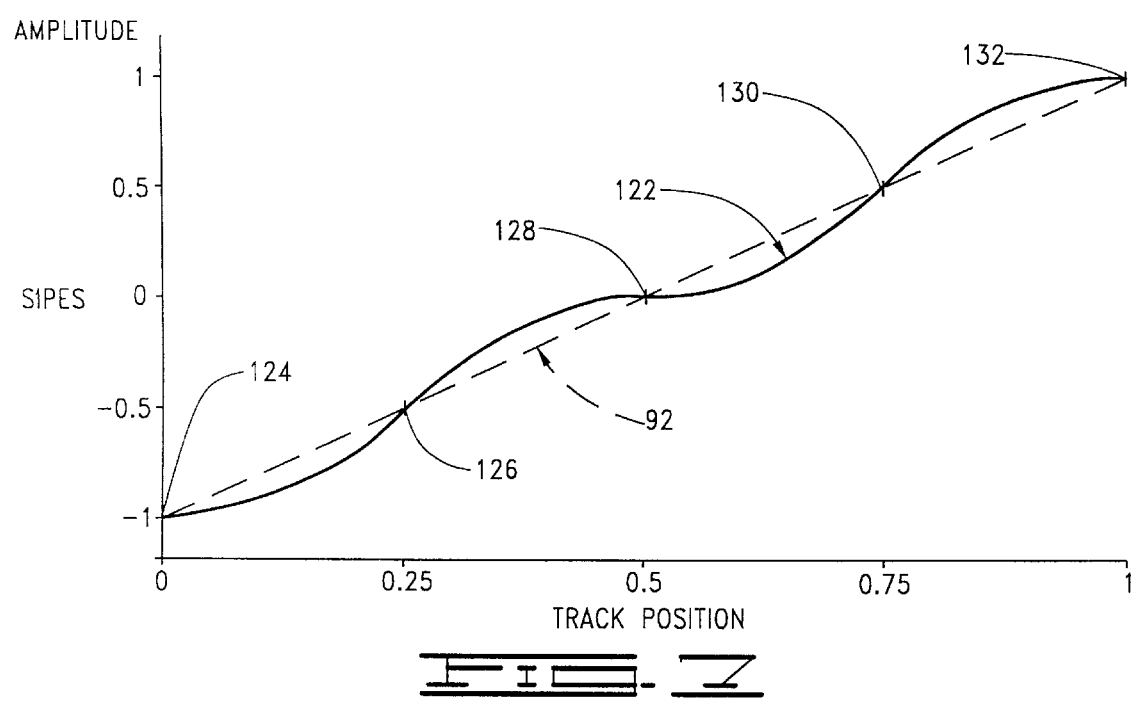
FIG. 7 is a graphical representation of a second type of position error signal generated from the burst signals of FIG. 4.

However, the S1PES will exhibit characteristics which are different from the characteristics of the SPES at other locations across the width of the track. Particularly, FIG. 7 has been provided to show an S1PES curve 122, determined in accordance with equations (3) and (4) above. As with FIG. 6, the horizontal axis of FIG. 7 represents the track position with respect to track 46 of FIG. 3 and the vertical axis of FIG. 7 shows the corresponding values of the S1PES curve 122. A portion of the idealized PES curve 92 has also been overlaid as shown. Like the SPES curve 102 of FIG. 6, the S1PES curve 122 has a value of −1 (at point 124) at the track boundary 0, a value of −0.5 (point 126) at the quarter-track position adjacent the track boundary 0, a value of 0 (point 128) at the track center, a value of +0.5 (point 130) at the quarter-track position adjacent the track boundary 1, and a value of +1 (point 132) at the track boundary 1.

However, the S1PES curve 122 exhibits different curvature between points 124, 126, 128, 130 and 132, as compared to the SPES curve 102 of FIG. 6. Particularly, portions of the S1PES curve 122 are concave between the points 124 and 126 and between the points 128 and 130, and portions of the S1PES curve 122 are convex between the points 126 and 128 and between the points 130 and 132. Again, the amount of curvature at these portions is dependent primarily upon the relationship between the head width and the track width, but other factors can affect the amount of curvature as well. It will be recognized, though, that the relationship between the head width and the track width and other factors affecting the generation of the curves 102, 122 will generally be consistent for both of the curves 102, 122 in the same disc drive 10.

Once the SPES and S1PES are generated, the servo microprocessor 58 proceeds to generate a third type of PES therefrom, which will be referred to herein as a "seamless-two PES" ("S2PES"). More particularly, the S2PES is generated in accordance with the following relationship:

$$S2PES=(\alpha)(SPES)+(1-\alpha)(S1PES) \quad (5)$$

where SPES is generated in accordance with equation (1) or (2) above, S1PES is generated in accordance with equation (3) or (4) above, and α is a constant value, determined in a manner to be described below. Generally, however, the value of a is selected to provide the same gain (S2PES slope) across the width of a selected track. Upon such selection for the value of α, the S2PES provides a nominally linear signal for all tracks, such as illustrated by the idealized PES curve 92 shown in FIG. 5.

Two preferred methodologies exist to select the appropriate value of α, each of which will be discussed in turn. The first methodology generally comprises initially setting the value of α equal to 1 and then adjusting the value of α until the average of the gain at the AB nulls is equal to the gain at the quarter-track locations. Once the value of α is selected, this value is thereafter used by the servo loop 50 in determining the S2PES in order to position the heads. The second methodology for selecting the value of α generally comprises accurately positioning the head with respect to a selected track, measuring SPES and S1PES at this position, and then calculating an appropriate value of α therefrom.

Figure 8:
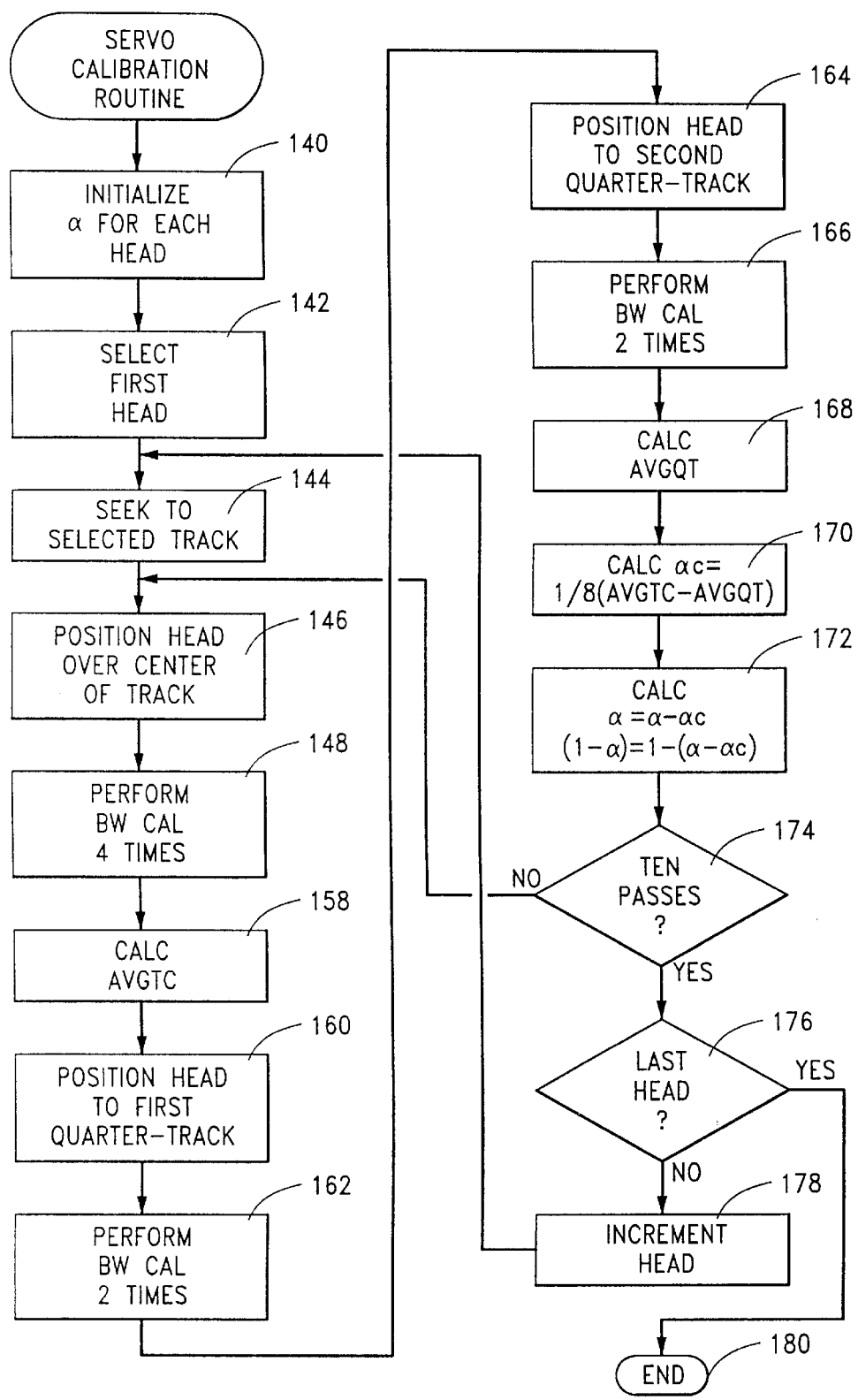
FIG. 8 is a flow chart illustrating a SERVO CALIBRATION routine performed by the disc drive of FIG. 1 in accordance with the preferred embodiment of the present invention.

Referring now to FIG. 8, shown therein is a flow chart for a SERVO CALIBRATION routine to carry out the first methodology to determine α. The routine is representative of programming stored in RAM 60 and used by the servo microprocessor 58. Alternatively, the SERVO CALIBRATION routine can be stored in disc drive memory (not shown) and performed by a disc drive system microprocessor (also not shown) in conjunction with the servo microprocessor 58. As will be recognized, the SERVO CALIBRATION routine can be performed on a selectively periodic basis as desired, such as during each initialization of the disc drive 10 upon power-up.

The routine of FIG. 8 begins at block 140, wherein the value of a is initialized for each head to a selected value (such as α=1 as described above). The flow continues to block 142, wherein the first head to be measured is selected. It will be recognized that in a dedicated servo system only the servo head will be selected, whereas in an embedded servo system all heads will be selected in turn.

Next, the selected head is positioned over a selected track, as shown in block 144. Although the routine of FIG. 8 could be performed for a plurality of tracks, in the preferred embodiment the selected track is located substantially in the center of the recording band of the disc stack 40. For purposes of illustration, the first selected head will be considered to be the head 32 and the selected track will be considered to be track 46.

The head 32 is then further positioned over the center of the track 46, as shown in block 146. It will be recognized that the servo loop 50 utilizes the S2PES described above to position the head 32.

Continuing with FIG. 8, once the head 32 is positioned over the selected track 46, the routine proceeds to measure the gain of the servo loop 50 a total of four successive times, as indicated by block 148. More particularly, block 148 calls a BANDWIDTH CAL routine, which is illustrated in FIG. 9.

As shown in FIG. 9, the BANDWIDTH CAL routine operates to measure the gain of the servo loop 50, which can be defined as the localized slope of the PES curve (such as curves 92, 102 or 122 of FIGS. 5, 6 or 7, respectively). More particularly, it will be recognized that the gain represents the change in the PES value with respect to track position. Thus, another way of describing the linear idealized PES curve 92 of FIG. 5 is as a curve having substantially constant gain with respect to track position, unlike the SPES curve 102 of FIG. 6 and the S1PES curve 122 of FIG. 7, which as previously discussed, do not display constant gain with respect to position across the width of the track 46.

The BANDWIDTH CAL routine of FIG. 9 measures the gain by injecting a sinusoidal test signal of a predetermined frequency and amplitude into the S2PES. The resulting sinusoidal test signal will cause the head to oscillate about the track center at the frequency of the test signal. The routine then measures the gain by measuring the change in the value (voltage, v) of the S2PES with respect to the resulting change in track position (x). That is, the gain is measured by determining $\Delta v$, which is the change in magnitude of the S2PES at each maximum excursion of the head 32 about the center of the track 46, determining $\Delta x$, which is the total radial distance the head 32 moves between successive maximum excursions, and then taking the ratio of $\Delta v/\Delta x$. For reference, additional discussion concerning the injection of sinusoidal test signals into a PES is provided in copending U.S. patent application Ser. No. 08/498,621 now U.S. Pat. No. 5,654,841 filed Jul. 7, 1995 by Hobson et al. entitled DETECTION OF MECHANICAL DEFECTS IN A DISC DRIVE USING INJECTED TEST SIGNALS, assigned to the assignee of the present invention and incorporated herein by reference.

Referring now to FIG. 9, a test signal of predetermined frequency and amplitude is injected into the S2PES at block 150. More particularly, a cosine table resident in memory of the disc drive 10 (such as the RAM 64 of FIG. 1 or other disc drive memory not shown in the drawings) is utilized to generate digital samples representative of the test signal. In the preferred embodiment, a frequency of 450 Hz is used. As will be recognized, the injection of the test signal will result in the oscillation of the head 32 with respect to the center of the track 46 as the servo loop 50 corrects the position of the head 32 using the S2PES with the injected test signal.

As the head 32 oscillates about the center of the track, the value (voltage, v) of the S2PES at each extreme excursion is measured and the difference ($\Delta v$) is calculated, as shown in block 152. Next, the gain is calculated in block 154 from the relationship ($\Delta v$)/($\Delta x$), with $\Delta x$ representative of the distance that the head 32 moves between successive extreme excursions about the center of the track 46. The gain is then temporarily stored, as indicated by block 156.

As previously discussed, the operation of block 148 of FIG. 8 results in the operation of the BANDWIDTH CAL routine of FIG. 9 a total of four successive times, and the temporary storage of four successive gain measurements. The flow of FIG. 8 continues at block 158, where an average gain at the track center (AVGTC) is determined from the four previously stored gain measurements.

Once the value of AVGTC is determined, as shown by block 160 the head 32 is moved to a first quarter-track position, which is identified as halfway between the center of track 46 and track boundary 0, as shown in FIG. 3. Once the head 32 is positioned over the first quarter-track position, the BANDWIDTH CAL routine of FIG. 9 is again performed, this time twice, so that two gain measurements are temporarily stored as a result of the operation of block 162.

The head 32 is then moved to a second quarter-track position by block 164 of FIG. 8, the second quarter-track position being identified as halfway between the center of track 46 and track boundary 1, as shown in FIG. 3. Once the head 32 is so positioned, the BANDWIDTH CAL routine of FIG. 9 is again performed, also twice, so that two gain measurements are also temporarily stored for the second quarter-track position as a result of the operation of block 166.

The flow of FIG. 8 continues at block 168, wherein an average of the gain measurements for the first and second quarter-track positions determined by blocks 162 and 166 is determined. This average is identified as AVGQT in FIG. 8 and comprises the average gain of the four quarter-track position gain measurements obtained by the operation of blocks 162 and 166.

Once the value of AVGQT is determined, block 170 determines an alpha-correction value (identified as "αc") from the values of AVGTC and AVGQT; more particularly, αc is determined from the difference between AVGTC and AVGQT, divided by 8. The divisor 8 establishes a time-constant for the convergence of the value of α, as it has been found desirable to not converge the value of α too quickly. By dividing the difference of AVGTC and AVGQT by 8, the solution process is more immune to the effects of noise in the system and more readily progresses to a final converged solution in a minimum amount of time.

Once αc is determined, a new value for α is determined by subtracting αc from the previous value of α, as shown in block 172. Additionally, a new value for (1−α) is also determined by block 172, as shown.

As the routine of FIG. 8 operates to iterate to a final solution for α, decision block 174 determines whether α has been calculated a total of 10 times, in order to determine a final, converged solution for α. If not, the routine passes from the decision block 174 back to block 146, so that a new value for a is obtained, in accordance with the foregoing description. In the preferred embodiment, the routine of FIG. 8 determines the value of α a total of 10 consecutive times. Although the use of 10 passes to ensure convergence of α is the preferred approach, it is contemplated that other, similar methodologies could readily be implemented, such as using another total number of passes besides 10, or continuing testing until the difference between successively obtained values of α falls below a predetermined acceptance threshold. It will be recognized that the selected iterative approach should desirably provide a converged solution in a controlled manner, while requiring a minimum amount of time.

The flow of FIG. 8 continues at decision block 176, wherein the routine determines whether the selected head is the last head to be measured. If not, the routine passes to block 178, wherein the next head is selected and the routine continues as described hereinabove to determine α and (1−α) values for each selected head, in turn. Once all of the heads have been selected and values determined, the routine ends at block 180.

As provided above, a second preferred methodology is contemplated for determining the value of α. Instead of utilizing an iterative approach, such as described with reference to FIGS. 8 and 9 above, the value of α can be determined in accordance with an ALPHA CALC routine, as shown in FIG. 10. As described below, it is contemplated that the ALPHA CALC routine is performed during manufacturing of the disc drive 10 in conjunction with an external positioning system to accurately position the heads, such as a laser-based positioning system used to write the position field 80. One such laser based positioning system is model 137K15, manufactured by Teletrak Inc.

Referring to FIG. 10, the ALPHA CALC routine begins at block 202, wherein the value of α is set to a selected value, such as α=1, for each head. The first head to be measured is selected at block 204, and again for purposes of illustration, the first head will be considered to be the head 32, as shown in FIG. 3.

At block 206, the selected head 32 is positioned over a selected track, which again can be any track, but preferably is a track substantially in the middle of the recording band of the disc stack 40. For clarity, the selected track will be considered to be the track 46 shown in FIG. 3.

Once the head 32 is positioned over the track 46, the flow passes to block 208, wherein the head 32 is moved to an eighth-track position, which comprises a position halfway between the first quarter-track position and the track boundary 0, as shown in FIG. 3. The positioning system is used to place the head to the eighth-track position, preferably by moving the head 32 to the center of the track 46 (determined by locating the AB null) and then accurately moving the head 32 a distance equal to ⅜ of the track away from the center of the track 46. Once so positioned, a plurality of both SPES and S1PES values are obtained, as indicated by block 210. Preferably, at least four SPES values and four S1PES values are measured and stored by block 210. The flow of FIG. 10 then passes to block 212, where the measured values are averaged to obtain AVGSPES and AVGS1PES values, as shown.

Thereafter, once the average values AVGSPES and AVGS1PES are determined, the value of α is determined by block 214 in accordance with the following relationship:

$$(\alpha)(AVGSPES) + (1-\alpha)(AVGS1PES) = 0.125 \quad (6)$$

which reduces to $$(\alpha)(AVGSPES) + (1-\alpha)(AVGS1PES) = 0.125 \quad (6)$$

which reduces to $$\alpha = \frac{0.125 - AVGS1PES}{AVGSPES - AVGS1PES} \quad (7)$$

with 0.125 indicative of ⅛ of a track width. Once α is determined from block 214, the values of α and (1−α) are stored for the selected head 32 in block 216.

The flow of FIG. 10 then passes to decision block 218, which queries whether the selected head is the last head. If not, the flow passes to block 220 wherein the next head is selected and the routine is performed for the next head. At such time that the last head has been measured, the flow passes from the decision block 218 and ends at block 222.

It will be recognized that both of the preferred methodologies presented above will provide a resulting α value for each selected head, but the first methodology is suitable for both manufacturing as well as during subsequent use of the disc drive 10, whereas the second methodology is generally limited to use during disc drive manufacturing. Additionally, although particular examples of SPES and S1PES have been presented above, it will be recognized that different PES models, including higher order PES models, can be identified and weighted to generate the desired linearized PES. Moreover it is contemplated that more than two position error signals can be weighted in order to determine the final, linearized PES used in the operation of the servo loop 50.

Figure 11:
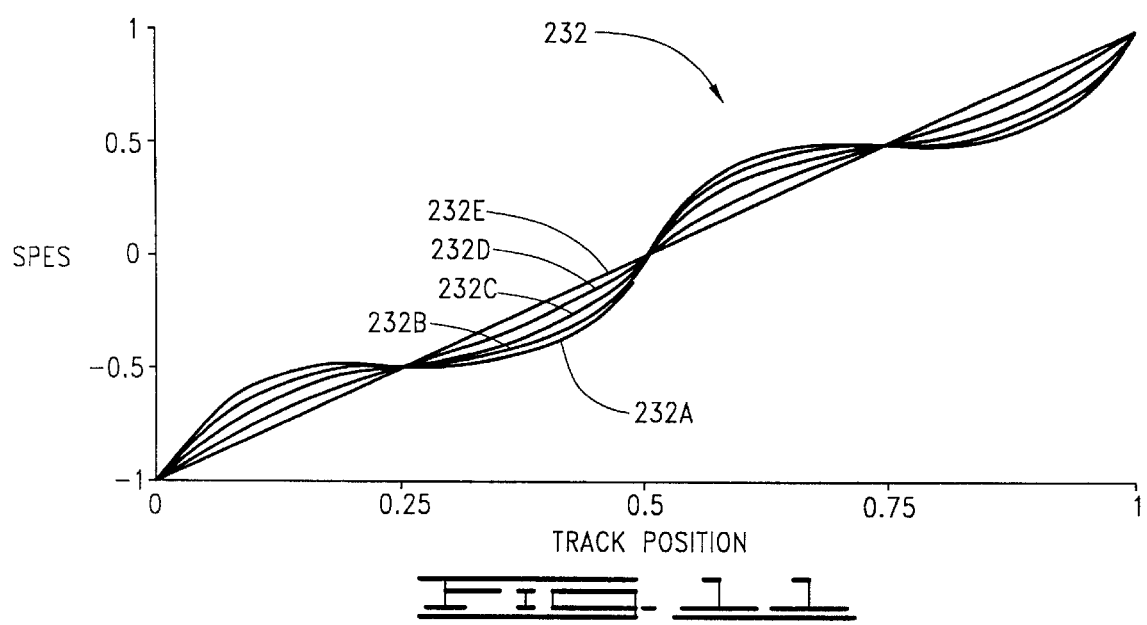
FIG. 11 provides a graphical representation of a set of SPES curves for head widths of 50%, 60%, 70%, 80% and 90% with respect to track width.
Figure 12:
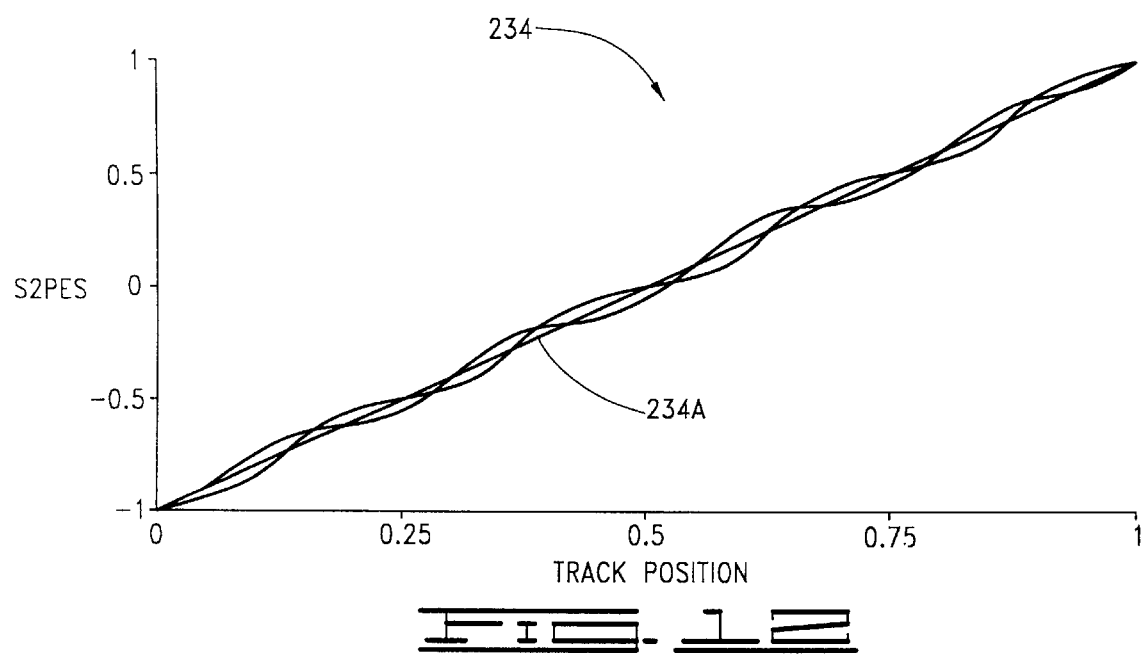
FIG. 12 provides a graphical representation of a set of S2PES curves for the head widths of FIG. 11.
Figure 13:
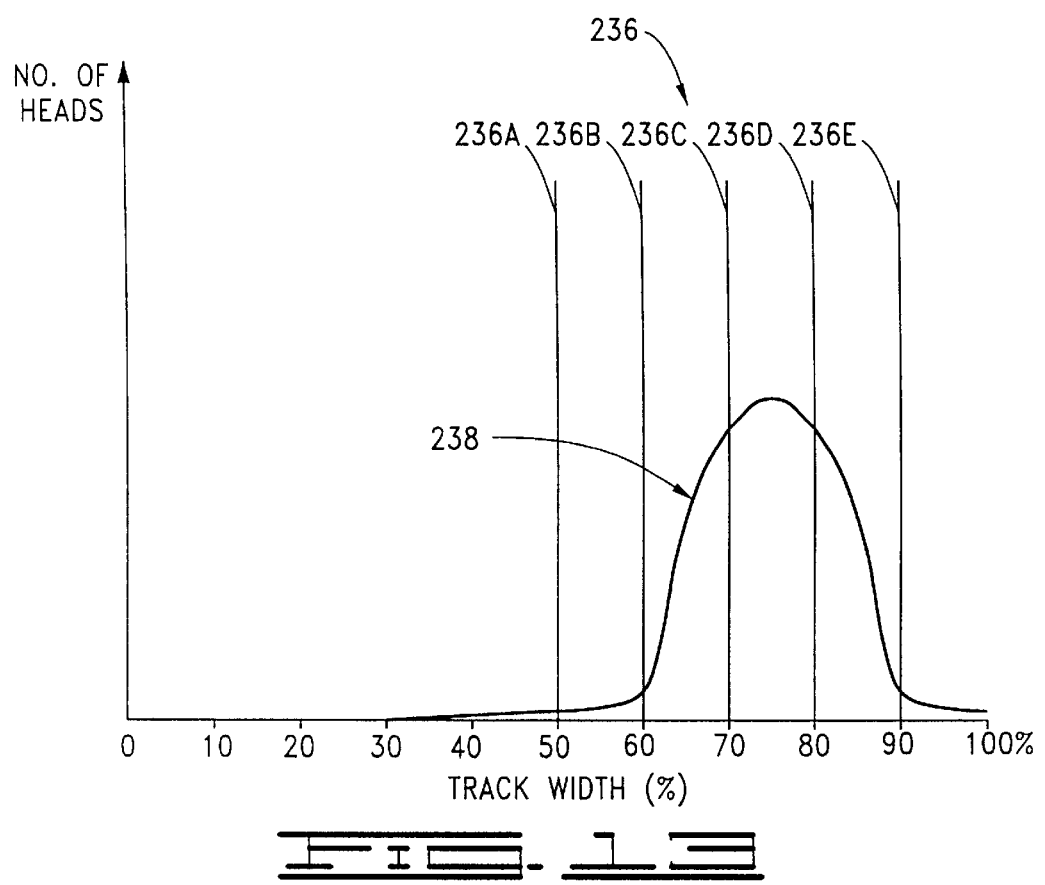
FIG. 13 provides a gaussian distribution curve indicative of a population of heads supplied for use by a population of disc drives nominally identical to the disc drive 10 of FIG. 1.

To provide an example of the benefits of the present invention in accommodating variations in head width with respect to the nominal width selected for the design of the disc drive 10, reference is now made to FIGS. 11–13, which consider head widths of 50%, 60%, 70%, 80% and 90% with respect to track width in the disc drive 10.

Beginning with FIG. 11, shown therein is a set of SPES curves (generally identified as 232) for a selected track, which for purposes of illustration will be considered to be the track 46 of FIG. 3. More particularly, as with FIGS. 5–7 above, FIG. 11 provides a horizontal axis indicative of track position from track boundary 0 to track boundary 1 (of FIG. 3) for the track 46. The vertical axis of FIG. 11 likewise illustrates the values of the SPES curves 232 with respect to position across the track 46.

The SPES curves 232 of FIG. 11 were generated using equation (1) above for head widths of 50%, 60%, 70%, 80% and 90% of the width of the track 46. As shown in FIG. 11, the width of the head (which for purposes of illustration will be considered to be the head 32 of FIG. 3) is an important factor in the curvature of each curve in the set of SPES curves 232. Particularly, curve 232A represents the SPES for a head having a width of 50% of the track 46 and, as shown, exhibits the greatest nonlinearity from the set of SPES curves 232. For reference, curves 232B, 232C, 232D and 232E correspond to head widths of 60%, 70%, 80% and 90%, respectively, for the head 32.

As shown in FIG. 11, only the curves 232C and 232D, corresponding to head widths of 70% and 80%, respectively, are sufficiently linear from the set of the SPES curves 232 for use as a position error signal. That is, the remaining curves 232A, 232D and 232E exhibiting sufficient nonlinearities to cause problems in servo control by the servo loop 50 (of FIG. 1).

However, through the use of the present invention to selectively weight the SPES curves 232 of FIG. 11 with a second set of S1PES curves (not shown) determined in accordance with equation (3) given above, a sufficiently linearized position error signal can be achieved for each head width. Referring now to FIG. 12, shown therein is a set of S2PES curves (identified generally as 234) for the head widths of head 32 discussed in FIG. 11. As shown in FIG. 12, the set of S2PES curves 234 are all sufficiently linear to provide robust servo control by the servo loop 50, and nominally correspond to the idealized PES curve 92 of FIG. 5. Although several of the curves from the set of S2PES curves 234 overlap, making individual identification of the curves difficult, it will be noted that even curve 234A, corresponding to a head width of 50%, is sufficiently linear to provide robust control by the servo loop 50.

The practical significance of FIGS. 11 and 12 is illustrated more fully when considered in view of FIG. 13, which provides a graphical representation of a gaussian distribution curve 238 representing a population of heads manufactured for use in disc drives nominally identical to the disc drive 10 of FIG. 1. FIG. 13 provides a horizontal axis indicative of track width, so that distances measured from the origin to the right indicate percentage (up to 100%) of track width. The vertical axis of FIG. 13 correspondingly represents the number of heads in the population of heads defined by the curve 238.

As shown in FIG. 13, in this particular example a nominal head width of 75% has been selected for the disc drive 10. Thus, the servo loop 50 has been designed to accommodate head widths of 75% of the nominal track width, and the procurement specifications for the heads call for this value. As a result, the curve 238 has a maximum value at 75% of the track width, indicative of the fact that the heads from the population of heads will have head widths which vary about the nominal value of 75%. For purposes of illustration, this nominal value corresponds to about 90 μin. (And the total track width is about 120 μin.).

Continuing with FIG. 13, vertical lines (denoted generally at 236) provide cutoff points for the percentage of the population of heads identified by the curve 238; that is, vertical line 236A corresponds to those heads from the population of heads having a width equal to 50% of the track width. Vertical lines 236B, 236C, 236D and 236E likewise correspond to heads in the population of heads having widths of 60%, 70%, 80% and 90%, respectively.

Thus, with reference to FIG. 11, where only heads having a head width of from 70% to 80% provided sufficiently linear SPES curves (232C and 232D), it will be recognized from FIG. 13 that only heads from the population of heads falling between the vertical lines 236C and 236D would be acceptable for use in the disc drive 10, using the SPES defined by equations (1) and (2) above. In the present example, this would correspond to heads of from about 84 μin. to about 96 μin. in width.

However, with reference to FIG. 12, it will be recognized that a much greater percentage of heads from the population of heads represented by the curve 238 can be utilized in the disc drive 10 as a result of the present invention; more particularly, heads having widths that fall between the vertical lines 236A and 236E (50% to 90%) will provide sufficiently linear position error signals with the use of the S2PES defined above. That is, head widths of from about 60 μin. to about 108 μin. could readily be used. Moreover, heads from the population of heads falling outside of the vertical lines 236A and 236E will, in many instances, also work to provide a sufficiently linear position error signal, as a result of the present invention.

Thus, by linearizing each head in the disc drive 10, the present invention accommodates a significantly larger variation in head width, allowing the use of a significantly greater percentage of heads provided by a head manufacturer, and significantly increasing the manufacturing yields for the disc drive manufacturer. As the heads are typically the most expensive components in a disc drive, next to the media, the advantages of the present invention to the disc drive manufacturer, and ultimately the consumer, are significant.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type including a disc and an actuator adjacent the disc, the actuator having a head and an actuator coil of a voice coil motor, the disc having a surface including a plurality of nominally concentric tracks, the tracks including servo burst patterns read by the head to provide servo burst signals having magnitudes indicative of the position of the head with respect to the servo burst patterns, the disc drive further including control circuitry for applying current to the actuator coil to position the head with respect to the tracks, a method for controlling the position of the head relative to a selected track, comprising the steps of:

generating digital representations of a first servo position error signal from the magnitudes of the servo burst signals from selected servo burst patterns of the selected track, the digital representations of the first servo position error signal having a magnitude indicative of the radial position of the head with respect to the selected track;

generating digital representations of a second servo position error signal from the magnitudes of the servo burst signals from the selected servo burst patterns of the selected track, the digital representations of the second servo position error signal having a magnitude indicative of the radial position of the head with respect to the selected track, wherein the magnitude of the digital representations of the second servo position error signal is different from the magnitude of the digital representations of the first servo position error signal over at least a portion of the width of the selected track;

generating digital representations of a third servo position error signal in relation to a sum of a weight value a multiplied by the digital representations of the first servo position error signal and a second weight value (1−α) multiplied by the digital representations of the second servo position error signal, the third servo position error signal having a magnitude which is substantially linear across the width of the selected track;

generating a correction signal from the magnitude of the digital representations of the third servo position error signal; and providing the correction signal to the control circuitry to output current to the actuator coil to position the head with respect to the selected track.

2. The method of claim 1, wherein the weight value α is determined in accordance with the following steps:

initially setting the weight value α to a selected value;

using the selected value to generate the digital representations of the third servo position error signal; and incrementing the weight value α, comprising the steps of:

using the digital representations of the third servo position error signal to position the head at a first position relative to the selected track;

obtaining a first gain measurement as the head is positioned at the first position;

moving the head to a second position relative to the selected track;

obtaining a second gain measurement as the head is positioned at the second position;

generating a correction value from the difference between the first and second gain measurements;

adjusting the weight value α by the correction value to obtain an adjusted weight value; and generating the digital representations of the third servo position error signal using the adjusted weight value.

3. The method of claim 2, wherein the first position is the center of the selected track.

4. The method of claim 2, wherein the second position is a quarter-track position over the selected track, the quarter-track position halfway between the center of the selected track and a selected track boundary of the selected track.

5. The method of claim 2, wherein the steps of obtaining the first and second gain measurements comprise the steps of:

providing digital representations of a sinusoidal test signal having a predetermined frequency and amplitude;

summing the digital representations of the sinusoidal test signal with the digital representations of the third servo position error signal to generate digital representations of an oscillating servo position error signal;

generating a correction signal from the digital representations of the oscillating servo position error signal;

outputting current to the actuator coil to position the head in response to the digital representations of the oscillating servo position error signal, the current causing the head to oscillate relative to the selected track;

determining the difference between the magnitude of the digital representations of the third servo position error signal at maximum excursions of the head as the head oscillates relative to the selected track; and determining the gain as the ratio of the difference between the magnitude of the digital representations of the third servo position error signal at the maximum excursions and the distance the head moves as the head oscillates relative to the selected track.

6. The method of claim 1, wherein the weight value α is determined in accordance with the following steps:

initially setting the weight value α to a selected value;

using the selected value to generate the digital representations of the third servo position error signal;

moving the head to a selected position of the selected track; and determining the value of the weight value α in accordance with the digital representations of the first and second servo position error signals obtained as the head is positioned over the selected position of the selected track.

7. The method of claim 6, wherein the selected position of the selected track comprises an eighth-track position, the eighth track position comprising a position one-eighth of the track width away from a selected track boundary of the selected track.

8. A method for controlling the position of a head in a disc drive of the type having a rotatable disc and an actuator adjacent the disc, wherein the head is moved by the actuator relative to the disc as a result of current applied to an actuator coil of the actuator, the disc having a plurality of concentric tracks with respective widths, the tracks including servo position fields which generate servo burst signals when read by the head, the magnitudes of the servo burst signals indicative of the position of the head relative to the servo position fields, the servo position fields comprising A, B, C and D burst patterns, the C and D burst patterns arrayed on the disc so as to define alternating even and odd tracks, wherein the width of each C burst pattern defines the boundaries of each corresponding even track and wherein the width of each D burst pattern defines the boundaries of each corresponding odd track, and wherein the A and B burst patterns alternately extend from the center of one track to the center of each adjacent track, the method comprising the steps of:

generating servo burst signals from selected burst patterns of a selected track;

generating a first position error signal from the servo burst signals nominally indicative of the position of the head with respect to the selected track;

generating a second position error signal from the servo burst signals nominally indicative of the position of the head with respect to the selected track;

generating a third position error signal as a weighted sum of the first and second position error signals, the third position error signal having a magnitude which is substantially linear across the width of the selected track;

determining a correction signal from the third position error signal; and using the correction signal to adjust the current applied to the actuator coil to position the head relative to the selected track.

9. The method of claim 8, wherein the servo burst signals comprise A, B, C and D burst signals having magnitudes A, B, C and D indicative of the position of the head relative to selected A, B, C and D burst patterns adjacent the selected track, wherein the first position error signal is generated using the magnitudes A, B, C and D from the relationship $$SPES=(A-B)/((|A-B|)+(|C-D|)),$$

wherein the second position error signal is generated using the magnitudes A, B, C and D from the relationship $$S1PES=(A-B)(|A-B|)/((A-B)^2+(C-D)^2),$$

and wherein the third position error signal is generated from the relationship $$S2PES=\alpha(SPES)+(1-\alpha)(S1PES),$$

wherein α is a weight value selected to provide the third position error signal with nominally linear gain across the width of the selected track.

10. The method of claim 9, wherein the step of selecting the weight value α comprises the steps of:

initially setting the weight value α to a selected value;

using the selected value to generate the third position error signal; and incrementing the weight value α, comprising the steps of:

measuring the gain as the head is positioned over the center of the selected track;

measuring the gain as the head is positioned over a quarter-track position, the quarter-track position comprising a position halfway between the center of the selected track and a track boundary of the selected track;

generating a correction value from the difference between the gain at the center of the track and the gain at the quarter-track position;

adjusting the weight value α by the correction value to obtain an adjusted weight value; and generating the third position error signal using the adjusted weight value.

11. The method of claim 9, wherein the step of selecting the weight value α comprises the steps of:

initially setting the weight value α to a selected value;

using the selected value to generate the third position error signal;

moving the head to a selected position of the selected track;

measuring the magnitudes of the first and second position error signals as the head is positioned over the selected position of the selected track; and determining the value of the weight value α in accordance with the magnitudes of the first and second position error signals.

12. A disc drive, comprising:

a rotatable disc on which a plurality of tracks are defined from servo information on the disc, the servo information comprising address fields which extend across substantially the entire width of each track so that each track is provided with a unique track address in relation to the associated address field, and servo burst patterns which facilitate identification of head position within each track;

a head, disposed adjacent the disc, which generates track address signals indicative of the unique track address of each track as the head passes relative to the address fields, and servo burst signals having magnitudes indicative of the position of the head with respect to the servo burst patterns as the head passes relative to the servo burst patterns; and a servo control circuit, operably coupled to the head, which controls the position of the head with respect to a selected track by generating a first position error signal as a first combination of servo burst signals from selected servo burst patterns associated with the selected track, generating a second position error signal as a second combination of the servo burst signals, and generating a third position error signal as a weighted Sum of the first and second position error signals.

13. The disc drive of claim 12, wherein the third position error signal comprises a weighted sum of the first and second position error signals determined by summing the product of the first position error signal and a weight value α with the product of the second position error signal and (1−α).

14. The disc drive of claim 12, wherein the servo control circuit comprises a programmable processor device with associated programming to generate the third position error signal.

* * * * *

UNITED STATES PATENT AND TRADEMARK OFFICE
CERTIFICATE OF CORRECTION

PATENT NO.   : 6,046,879
DATED        : April 4, 2000
INVENTOR(S)  : Randall D. Hampshire It is certified that error appears in the above-identified patent and that said Letters Patent is hereby corrected as shown below:

Column 9,
Line 26, replace "curve 42" with -- curve 92 --.

Column 13,
Lines 60 thru 65, The text printed at lines 60-62 is repeated at lines 64-65. The second occurrence should be deleted.

Signed and Sealed this

Twenty-sixth Day of February, 2002

Attest:

JAMES E. ROGAN
Attesting Officer         Director of the United States Patent and Trademark Office